United States Patent Office

2,950,228
Patented Aug. 23, 1960

2,950,228

ENZYMATIC PROCESS

Richard O. Marshall, Muscatine, Iowa, assignor to Corn Products Company, New York, N.Y., a corporation of Delaware No Drawing. Filed Sept. 1, 1959, Ser. No. 837,348

5 Claims. (Cl. 195—66)

This invention relates to the conversion of dextrose to levulose. More particularly it relates to the formation of levulose in dextrose-containing liquors, e.g., hydrolyzates of starch, through the action of enzymes.

It has been long known in the art that dextrose can be converted to levulose by heating solutions of dextrose in the presence of an alkaline catalyst. The product of such a reaction includes, in addition to the desired levulose, other substances which impart to the final product, usually a syrup, objectionable flavor and color. Although improvements in the art, e.g., U.S. 2,354,664, U.S. 2,746,889, have been made which minimize the formation of objectionable by-products, such processes have never been practiced commercially due to their high cost of operation and to the poor quality of the product.

An object of the present invention is to provide through the use of an enzyme a novel process for the conversion of dextrose to levulose. A further object is to provide a process for the formation of levulose in dextrose-containing liquors, particularly those obtained by acid or enzymatic hydrolysis of starch, without simultaneous production of undesirable side-reaction products. A further object is to provide a process for making a sweeter syrup than those produced from corn or other starches. Other objects will appear hereinafter.

I have discovered that dextrose can be converted to levulose by means of enzyme preparations which convert D-xylose to D-xylulose. This is a most surprising discovery in view of the findings and statements of other investigators. Enzymes are known which catalyze the interconversion of specific sugars which are structurally related through the first four carbon atoms; however, none of these has been reported to convert dextrose to levulose. For example, Mitsuhashi and Lampen (J. Biol. Chem., 204, 1011 (1953)), Hochster and Watson (Arch. Biochem. Biophys., 48, 120 (1954)), and Slein (J. Am. Chem. Soc., 77, 1663 (1955)) obtained enzyme preparations from *Lactobacillus pentosus*, *Pseudomonas hydrophila*, and *Pasterurella pestis*, respectively which were capable of catalyzing the isomerization of D-xylose to D-xylulose. In each case, these investigators reported that the enzyme preparations which converted D-xylose to D-xlyulose did not convert D-glucose to D-fructose.

I now have discovered that enzyme preparations which will convert D-xylose to D-xylulose, i.e., enzyme preparations containing xylose isomerase, will convert dextrose to levulose provided the dextrose concentration in the solution being treated with the enzyme preparation is above a certain minimum value. Above this value, dextrose is efficiently converted to substantial amounts of fructose; below this value, the amount of fructose formed, if any, is so small as to be immeasurable by ordinary analytical procedures. This is a surprising discovery in view of the fact that it is well known that, in general, the lower the concentration of the substrate in an enzymatic conversion, the higher the efficiency of the enzyme. Presumably, the enzyme, at concentrations of dextrose lower than this does not survive long enough to produce any measurable quantity of fructose. There is no upper limit to the concentration of dextrose which may be used; the reaction mixture may be supersaturated with respect to dextrose or may even contain an excess of undissolved dextrose.

To apply the invention, an enzyme preparation is obtained which will actively convert D-xylose to D-xylulose. The source of the enzyme preparation is unimportant, but one convenient means of obtaining such a preparation is by the growth of *Pseudomonas hydrophila* on a nutrient medium containing xylose. The nutrient medium may be such as the one described by Hochster and Watson. After separation from the growth medium, the enzyme preparation is added to a liquor containing dextrose at a concentration of at least about 0.2 molar, and the mixture is incubated until the desired degree of conversion has been obtained. Thereafter, the liquor is refined and concentrated in conventional manner to provide either a syrup or crystalline levulose.

Depending on the source of the enzyme preparation and on the materials present in the enzyme preparation, it may be possible to increase the rate of reaction by the addition of activators such as magnesium or manganese ions. It may be possible in some cases to minimize side reactions by addition of inhibtors such as sodium arsenate, sodium arsenite, and sodium fluoride. In cases where the pH value at a constant level by continuous or periodic the enzyme preparation contains acid-forming reactants, it will be desirable to buffer the system, or to maintain neutralization. Data are presented in Table I which show the effect of pH and temperature on the formation of levulose in a solution containing 3.6 grams per 100 ml. of dextrose. Although it is obvious that the reaction can be conducted over a wide range of pH and temperature values, the optimum pH for the action of an enzyme preparation derived from *Pseudomonas hydrophila* was found to be about 8.5 and the optimum temperature was found to be about 40° C. to about 45° C.

TABLE I

[Micromoles levulose formed per hour per 100 mg. enzyme preparation.]

| pH | 35° C. | 40° C. | 45° C. | 50° C. |
|---|---|---|---|---|
| 7.5 | 29.8 | 44.7 | 38.0 | 12.6 |
| 8.0 | 36.0 | 56.0 | 58.0 | 25.8 |
| 8.5 | 34.0 | 58.0 | 62.0 | 44.7 |
| 9.0 | 36.0 | 58.0 | 56.0 | 15.9 |

The following examples will illustrate the manner in which my invention may be applied. They are for illustrative purposes only and are not to be construed as limiting my invention. All enzyme preparations employed in the examples were obtained from bacterial cells grown in the nutrient medium described by Hochster and Watson (Arch. Biochem. Biophys., 48, 120 (1954)).

*Example I*

*Pseudomonas hydrophila* was grown in the above-mentioned nutrient medium containing D-xylose as the major source of carbon. The cells were harvested by centrifugation, washed and freeze-dried. The freeze-dried cells (5 grams) were incubated at pH 8.0 and 40° C. with 90 grams of dextrose, 0.015 mole of $Na_2HAsO_4$ and 0.0025 mole of $MgCl_2$ in a volume of 500 ml. After 40 hours, 33 percent of the dextrose had been converted to levulose. The mixture was deproteinized by the addition of 100 ml. of 0.5 M $HClO_4$ and centrifuged. The supernatant liquor was deionized by passage over appropriate ion-exchange resins. The deionized liquor was then concentrated to approximately 30 percent dry substance to yield a practically colorless levulose-bearing syrup containing 66 percent dextrose and 33 percent levulose. Levulose was isolated from the syrup as the calcium levulosate. Calcium was removed as the oxalate and levulose was crystallized from aqueous ethanol. The product, obtained in 18 percent yield based on the initial dextrose, had the following properties:

$[\alpha]_D^{20°} = -91.8$ (Lit.$=-92.0°$). M.P.$=101-103°$ C. (Lit.$=102-104°$ C.).

Example II

This example illustrates conversion by a cell free enzyme preparation.

A mixture containing the following final concentrations of components: dextrose, 18 g./100 ml.; arsenate buffer (pH 8.0), 0.05 M; $MgCl_2$, 0.05 M; and a freeze-dried sonic extract of xylose-grown *Pseudomonas hydrophila* cells; 20 mg. per ml.; was incubated at 40° C. for 73 hours. At the end of this period, the mixture was deproteinized with 0.5 M $HClO_4$. Upon analysis for levulose by the cysteine-carbazole method of Dische and Bohrenfreund, J. Biol. Chem., 192, 583 (1951), it was found that 24 percent of the dextrose present had been converted to levulose.

Example III

This example illustrates conversion of dextrose to levulose in the absence of inhibitors.

A mixture containing the following final concentrations of components: dextrose, 36 g./100 ml.; $NaHCO_3$, 0.02 M; $MgCl_2$, 0.005 M; and 10 mg. per ml. of freeze-dried cells of xylose-grown *Pseudomonas hydrophila* was incubated at 40° C. After 43 hours the mixture was deproteinized with 0.5 M $HClO_4$. Upon analysis for levulose by the cysteine-carbazole method of Dische and Bohrenfreund (J. Biol. Chem., 192, 583 (1951)), it was found that 11.1 percent of the dextrose present had been converted to levulose.

Example IV

This example illustrates conversion of dextrose to levulose by means of a xylose-grown member of the genus Bacillus.

A mixture containing the following final concentrations of components: dextrose, 18 g./100 ml.; arsenate buffer (pH 8.0), 0.05 M, $MgCl_2$, 0.01 M; and 10 mg. per ml. of freeze-dried cells of a xylose-grown Bacillus isolated from laboratory air was incubated at 40° C. After 42 hours the mixture was deproteinized with 0.5 M $HClO_4$. Upon analysis for levulose by the cysteine-carbazole method of Dische and Bohrenfreund (J. Biol. Chem., 192, 583, (1951)), it was found that 36 percent of the dextrose present had been converted to levulose.

Example V

This example shows how additional cultures which form xylose isomerase may be obtained, and the application of enzyme preparations from these cultures to the isomerization of dextrose.

Media composed of the following:

|  | g. |
|---|---|
| Xylose | 30.0 |
| $NaNO_3$ | 3.0 |
| $K_2HPO_4$ | 1.0 |
| $MgSO_4.7H_2O$ | 0.5 |
| KCl | 0.5 |
| $FeSO_4.7H_2O$ | 0.01 |
| Water to 1000 ml. | | were inoculated with samples of soil from various sources. The inoculated media were incubated in shake flasks at 30° C. Transfers to successive flasks of the same medium were made at 2 to 4 day intervals. After the sixth successive transfer, the cultures were plated on nutrient agar medium containing 1 percent xylose. Transfers were made from well-isolated colonies to nutrient agar slants. Freeze-dried cells were obtained from these cultures in the manner described in Example I. The preparations were then tested for xylose isomerase activity and for their ability to convert dextrose to levulose. In each case, cell preparations which contained xylose isomerase activity were able to convert 0.2 molar dextrose solution to substantial amounts of levulose. In each case where the cell preparations were devoid of xylose isomerase activity, no conversion of dextrose to levulose was obtained.

This application is a continuation-in-part of application Serial Number 630,025, filed December 24, 1956.

I claim:

1. Process for converting dextrose to levulose which comprises incubating a liquor containing dextrose at a concentration of at least about 0.2 molar with an enzyme preparation containing xylose isomerase.

2. Process according to claim 1 wherein the enzyme preparation is derived from Pseudomonas grown in a nutrient medium containing D-xylose.

3. Process according to claim 2 wherein inhibitors are present during the conversion.

4. Process according to claim 1 wherein the enzyme preparation is derived from *Pseudomonas hydrophila* grown in a nutrient medium containing xylose.

5. Process according to claim 1 wherein the enzyme preparation is derived from a xylose-grown member of the genus Bacillus.

No references cited.

UNITED STATES PATENT OFFICE

CERTIFICATE OF CORRECTION

Patent No. 2,950,228                          August 23, 1960

Richard O. Marshall

It is hereby certified that error appears in the printed specification of the above numbered patent requiring correction and that the said Letters Patent should read as corrected below.

Column 2, line 27, strike out "the pH value at a constant level by continuous or periodic" and insert the same after "maintain" in line 29, same column; column 4, line 38, for "anzyme" read -- enzyme --.

Signed and sealed this 4th day of April 1961.

(SEAL)
Attest: ERNEST W. SWIDER

Attesting Officer

ARTHUR W. CROCKER
Acting Commissioner of Patents

Disclaimer and Dedication

2,950,228.—*Richard O. Marshall*, Muscatine, Iowa. ENZYMATIC PROCESS. Patent dated Aug. 23, 1960. Disclaimer and dedication filed Jan. 13, 1975, by the assignee, *CPC International Inc.*

Hereby disclaims and dedicates to the Public the entire remaining term of said patent.

[*Official Gazette April 29, 1975.*]